April 1, 1941.  C. H. ZIMMERMAN ET AL  2,237,207
TIRE
Filed Dec. 18, 1940
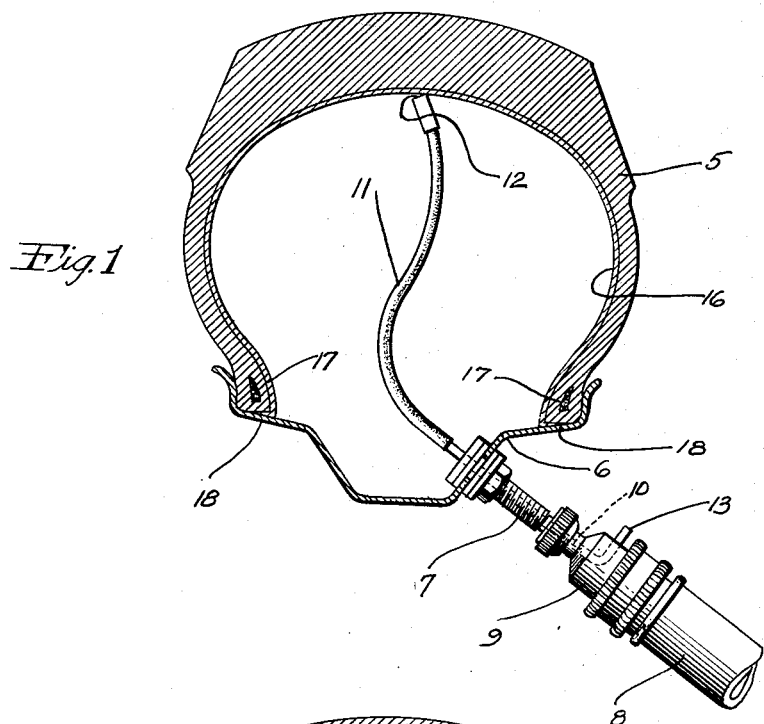
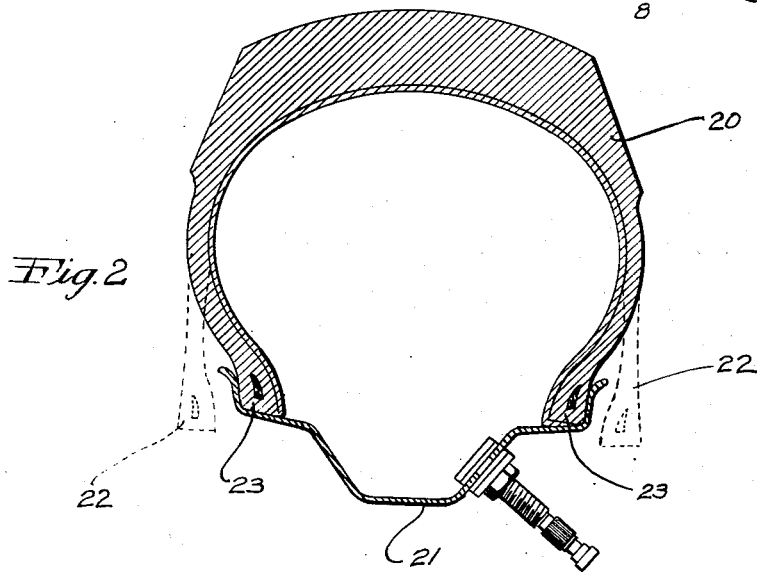
Inventor
Charles H Zimmerman
and William W. McMahan
By
Attorney

UNITED STATES PATENT OFFICE 2,237,207

TIRE

Charles H. Zimmerman and William W. McMahan, Akron, Ohio, assignors to Wingfoot Corporation, Wilmington, Del., a corporation of Delaware Application December 18, 1940, Serial No. 370,643

1 Claim. (Cl. 152—330)

This invention relates to an improvement in open-beaded vehicle tires, their manufacture, treatment and use. More particularly it relates to the use of such a tire without a tube and with water as an inflating medium. In the preferred form of the invention no air is used for inflation, but water under pressure is employed. Instead of water other liquids may be used. When water is employed some usual compound is advantageously added to it to prevent freezing in cold weather.

In all previous attempts to use water in the inflation of vehicle tires, the water has been enclosed by the tire structure itself, or by means of the usual inner tube therein. It has never previously been suggested that the water be used in a cavity bounded in part by the tire and in part by the rim on which the tire is mounted. According to this invention a liquid medium, preferably water, is used for the desired degree of inflation of the tire, and the tire employed may be of the type now commonly used with an inner tube. It may be a somewhat modified type as suggested below.

The invention will be further described in connection with the accompanying drawing in which Fig. 1 shows a section through a tire mounted on a rim with means for filling the tire completely with water, and Fig. 2 illustrates the mounting of an improved type of tire on a rim.

In Fig. 1 the tire 5 is mounted on the usual drop center rim 6, without a tube. The rim itself is equipped with a valve 7 provided with a fluid-tight joint at the rim for filling the tire with water and removing the air. The valve 7 may be of a commercial type now employed for partially filling inner tubes with water and venting air therefrom. Various means for filling a tire with a liquid and removing all the air from the tire are known in the art. They have been employed previously for completely filling a tire with a liquid, such as a viscous liquid which has later been converted to a solid spongy mass. For the purpose of illustrating means for completely filling the tire with water the valve 7 is shown connected with a hose 8 which is connected to a source of water, and the hose is fastened onto the valve 7 by a suitable coupling 9. The valve 7 has an air outlet 10 which is connected with the air-removing device 11 inside of the tire. This air-removing device may be of the type previously used. For the purpose of illustration, however, it may, for example, be a rubber tubing to which some floating material, such as cork, has been fastened, either as a coating or otherwise. The open end 12 is adjacent the top of the tire, and as the tire is filled with water the air is vented by entering this open end of the tube 11 and passing out through the air escape 10. After introducing the desired amount of water into the tire the air escape or outlet 10 is closed with the closure cap 13. This is disclosed and claimed in the copending application of Andrew J. Palko, Serial No. 370,654, filed December 18, 1940.

In order to make the tire more impervious and to protect the fabric from the action of the water or other liquid used for inflation the inner wall of the tire and the beads 17 are coated with a layer of rubber 16 or the equivalent, and this is preferably applied from solution in a volatile solvent or conventionally applied as a skin coat. This layer of rubber may, for example, be .03 inch thick. The coating on the beads forms a smooth surface which provides an effective seal contact with the rim seats 18 and prevents any loss of water between the beads and rim.

A tire mounted on a rim as shown in Fig. 1 may be partially or completely filled with water. For example, seventy-five per cent of the cavity provided between the tire and rim may be filled with water or ninety-five per cent may be filled with water. In the preferred form of the invention the tire is completely filled with water and absolutely all of the air is removed from the interior of the tire, with the water maintained under hydrostatic pressure. If the tire is only partially filled with water at a desired pressure the air-venting tube 11 shown in Fig. 1 is unnecessary. When the tire is only partially filled with water, the balance being air, it has been found that the air present in the tire gradually passes out through the walls of the tire, resulting in slow pressure loss, until eventually all the air has escaped, and the tire when repeatedly subjected to additional water injection becomes filled completely with water. The most advantageous manner of completely filling the tire with water involves venting the air as the water is introduced and placing the water within the tire under a hydrostatic pressure which is suited to the load and service conditions.

Various advantages result from completely filling the tire with water and maintaining the water under hydrostatic pressure. In the first place water does not seep through the tire the way air does, and it has been found that even over a period of many months of severe usage no water or pressure is lost from a tire from which considerable air would be lost under similar circumstances. This is particularly important in connection with tires used on tractors, farm implements and other implements where, at the present time, considerable damage is caused by under-inflation, due to improper care, and where it is difficult to keep tires at proper inflation. Under-inflation is avoided with water inflation where no loss of water occurs.

Another advantage in completely filling the tire with water and maintaining a pressure within the tire lies in the fact that vehicles equipped with such tires do not vibrate in the way that the same vehicles equipped with pneumatic tires are known to vibrate. Filling the tires with water deadens the vibration very materially.

When the cavity between the tire and rim is filled with water there is no air in contact with the rim and rusting of the rim is prevented.

When the weight on a pneumatic tire is increased or decreased the amount that the tire is deflected varies accordingly. This disadvantage is overcome to a large extent by filling a tire completely with water since the water is incompressible, and there is less change in the deflection of a water-filled tire with a change in load than in an air-filled tire.

The use of water instead of air in a tire increases the unsprung weight of the vehicle, thereby affording better traction and eliminating the conventional wheel weights. If it is desired to keep the total vehicle weight constant, the use of water in the tires will permit reduction in the weight of metallic chassis parts, with consequent saving in cost. Further advantages, demonstrated in service, indicate consumption of less fuel, less packing of the soil and longer life of the tire due to assurance of freedom from under-inflation, etc. It appears also that many punctures which damage pneumatic tires equipped with inner tubes do not cause a water-filled tubeless tire to leak. For example, a small puncture through a water-filled tire may occur without loss of water or effective pressure. The similar treatment of a pneumatic tire would, of course, damage it to the point where it would be necessary to repair the tire or at least the tube before further use, if indeed, as is frequently the case, the tire is not destroyed by use in its undetected state of under-inflation.

The operator will find considerable difficulty in mounting a conventional tubeless tire on a drop center rim and then inflating the tire with water. The principal difficulty lies in the fact that conventional tires are made with the distance between the beads less than the distance between the seats of the rim on which the tire is to be mounted. The beads have to be spread to seat such a tire. It has been found that it is much easier to seat a tire which is so made that the beads are normally spaced a greater distance apart than the seats of the rim on which the tire is to be mounted. This is disclosed and claimed in copending application of William W. McMahan, Serial No. 370,645, filed December 18, 1940.

Fig. 2 shows a tire, the beads of which are molded wider apart than the beads of the conventional tire. The tire 20 is mounted on the drop-center rim 21. The tire before mounting is shown in dotted lines and indicated by the numeral 22. The beads 23 of the tire are shown in full lines as being seated on the rim. The beads before mounting are spread some several inches farther apart than after mounting, and they may be spread as much as one-third or more of the distance between the outer edges of the beads after mounting.

The tire may be molded with the beads far apart as shown, or a conventional tire after molding may have its beads spread, and while they are held in the spread condition, the tire may be heated to the vulcanizing temperature and thus further vulcanized to cause the beads to set in spread condition.

In mounting tires without tubes for inflation with water, it has been found difficult to seat the beads and inflate. With tires molded with beads spread wide apart as shown in Fig. 2, the beads are pressed together as the tire is placed on the rim and when the pressure is released the beads are sprung onto the bead seats. Some assistance may be required to properly seat the beads. This may be in the nature of mechanical means for spreading the beads or inflation of the tire with air under pressure. Once the beads are seated on the rims a water-tight joint is formed between the beads of the tire and the rims, and the cavity between the tire and rim may be inflated with water without danger of water leakage. Fig. 2 shows no valve means for inflating the tire, but any suitable valve means may be employed.

What we claim is:

In combination with a vehicle wheel rim and mounted thereon a beaded tire closed between the beads solely by the rim, the beads of the tire forming a water-tight union with the edges of said rim, and the cavity thus formed by the rim and the interior of the tire being completely filled with water under pressure contacting the inner surface of the tire and the rim.

CHARLES H. ZIMMERMAN.
WILLIAM W. McMAHAN.